US012745145B2

(12) United States Patent
Hathiramani et al.

(10) Patent No.: US 12,745,145 B2
(45) Date of Patent: Sep. 22, 2026

(54) UNCONFIGURED MEASUREMENT GAPS HANDLING FOR FRAME BASED EQUIPMENT (FBE) OPERATION

(71) Applicant: Nokia Technologies Oy, Espoo (FI)

(72) Inventors: Navin Hathiramani, Dallas, TX (US); Claudio Rosa, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 352 days.

(21) Appl. No.: 18/576,279

(22) PCT Filed: Jul. 9, 2021

(86) PCT No.: PCT/US2021/040989
§ 371 (c)(1),
(2) Date: Jan. 3, 2024

(87) PCT Pub. No.: WO2023/282905
PCT Pub. Date: Jan. 12, 2023

(65) Prior Publication Data

US 2024/0259899 A1 Aug. 1, 2024

(51) Int. Cl.
*H04W 36/00* (2009.01)

(52) U.S. Cl.
CPC ... *H04W 36/0088* (2013.01); *H04W 36/0061* (2013.01)

(58) Field of Classification Search
CPC ... H04W 24/10; H04W 72/23; H04W 74/006; H04W 36/0061; H04W 24/08
See application file for complete search history.

(56) References Cited

U.S. PATENT DOCUMENTS 8,094,554 B2 1/2012 Gholmieh et al.
8,750,807 B2 6/2014 Lin et al.
(Continued)

FOREIGN PATENT DOCUMENTS

WO 2019/210969 A1 11/2019
WO 2020/259789 A1 12/2020

OTHER PUBLICATIONS

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

(Continued)

*Primary Examiner* — Shukri Taha
(74) *Attorney, Agent, or Firm* — SQUIRE PATTON BOGGS (US) LLP

(57) ABSTRACT

Systems, methods, apparatuses, and computer program products for handling measurement gaps for frame based equipment (FBE) operation are provided. One method may include receiving at a user equipment, from a serving cell, assistance information that includes at least one of a fixed frame period (FFP) configuration of the serving cell, a reference signal timing configuration for at least one neighbor cell and system frame number (SFN) and frame timing difference reporting information for the at least one neighbor cell. The method may also include determining whether there is transmission from the serving cell during a period of time and, in accordance with a determination that there is no transmission from the serving cell during the period of time, based at least on the assistance information, performing measurement of the at least one neighbor cell during the period of time.

20 Claims, 7 Drawing Sheets

(56) References Cited

U.S. PATENT DOCUMENTS

| | | | | |
|---|---|---|---|---|
| 10,237,844 | B2 | 3/2019 | Siomina et al. | |
| 2017/0150436 | A1 | 5/2017 | Modarres Razavi et al. | |
| 2018/0324620 | A1 | 11/2018 | Harada et al. | |
| 2019/0174341 | A1 | 6/2019 | Chincholi et al. | |
| 2019/0222478 | A1 | 7/2019 | Yi et al. | |
| 2019/0373571 | A1 | 12/2019 | Damnjanovic et al. | |
| 2020/0037354 | A1 * | 1/2020 | Li | H04W 74/0808 |
| 2020/0084759 | A1 | 3/2020 | Liu et al. | |
| 2020/0322827 | A1 | 10/2020 | Yao et al. | |
| 2021/0014752 | A1 * | 1/2021 | Axmon | H04W 36/26 |
| 2021/0289548 | A1 * | 9/2021 | Murray | H04W 72/23 |
| 2022/0183064 | A1 * | 6/2022 | Talarico | H04W 74/0808 |
| 2023/0389119 | A1 * | 11/2023 | Araujo | H04W 76/15 |
| 2024/0098781 | A1 * | 3/2024 | Tsai | H04W 74/0808 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"3rd Generation Partnership Project; Technical Specification Group Radio Access Network; NR; Requirements for support of radio resource management (Release 15)", 3GPP TS 38.133, V15. 12.0, Dec. 2020, 1205 pages.

"Msc-generator", Sourceforge, Retrieved on Jan. 30, 2024, Webpage available at :https://sourceforge.net/projects/msc-generator/.

"Summary of offline 106—[NTN] SMTC and gaps—first round", 3GPP TSG RAN WG2 Meeting #113bis-e, R2-17xxxxx, Agenda: 8.12.3.1, Intel Corporation, Apr. 12-20, 2021, 14 pages.

International Search Report and Written Opinion received for corresponding Patent Cooperation Treaty Application No. PCT/US2021/040989, dated Oct. 6, 2021, 12 pages.

Extended European Search Report received for corresponding European Patent Application No. 21949493.7, dated Feb. 7, 2025, 11 pages.

"Remaining issues on measurement requirements in NR-U", 3GPP TSG-RAN WG4 Meeting #94-e-Bis, R4-2003559, Agenda: 6.1.5.11, Qualcomm Incorporated, Apr. 20-30, 2020, 8 pages.

* cited by examiner

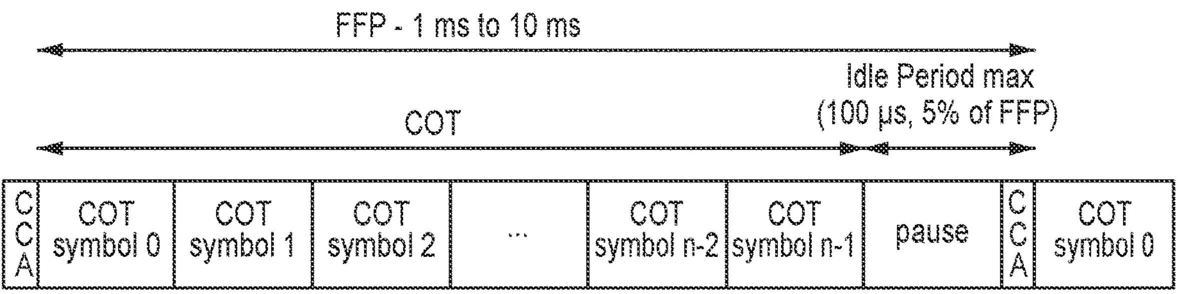
Fig. 1
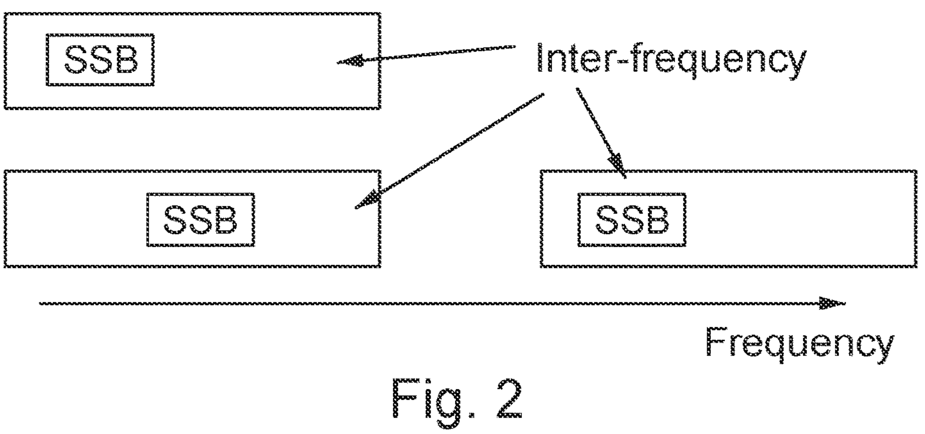
Fig. 2
| measGapSharingScheme | Value of X (%) |
|---|---|
| '00' | Equal splitting |
| '01' | 25 |
| '10' | 50 |
| '11' | 75 |
| Note: It is left to UE implementation to determine which measurement gap sharing scheme in the table to be applied, when MeasGapSharingScheme is absent and there is no stored value in the field. | |
Fig. 3

3GPP defined Gap Patterns

| Gap Pattern Id | Measurement Gap Length (HGL, ms) | Measurement Gap Repetition Period (MORP, ms) | Overhead from gaps (%) |
|---|---|---|---|
| 0 | 6 | 40 | 15% |
| 1 | 6 | 20 | 8% |
| 2 | 3 | 40 | 8% |
| 3 | 3 | 80 | 4% |
| 4 | 6 | 20 | 30% |
| 5 | 6 | 160 | 4% |
| 6 | 4 | 20 | 20% |
| 7 | 4 | 40 | 10% |
| 8 | 4 | 80 | 5% |
| 9 | 4 | 160 | 3% |
| 10 | 3 | 20 | 15% |
| 11 | 3 | 160 | 2% |
| 12 | 5.5 | 20 | 28% |
| 13 | 5.5 | 40 | 14% |
| 14 | 5.5 | 80 | 7% |
| 15 | 5.5 | 160 | 3% |
| 16 | 3.5 | 20 | 18% |
| 17 | 3.5 | 40 | 9% |
| 18 | 3.5 | 80 | 4% |
| 19 | 3.5 | 160 | 2% |
| 20 | 1.5 | 20 | 8% |
| 21 | 1.5 | 40 | 4% |
| 22 | 1.5 | 80 | 2% |
| 23 | 1.5 | 160 | 1% |

Potential gains

Fig. 4

UNCONFIGURED MEASUREMENT GAPS HANDLING FOR FRAME BASED EQUIPMENT (FBE) OPERATION

RELATED APPLICATION

This application claims priority to PCT Patent Application No. PCT/US2021/040989, filed Jul. 9, 2021, and entitled "UNCONFIGURED MEASUREMENT GAPS HANDLING FOR FRAME BASED EQUIPMENT (FBE) OPERATION", which is incorporated herein by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods of handling measurement gaps for frame based equipment (FBE) operation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to a method, which may include receiving at a user equipment, from a serving cell, assistance information that may include at least one of a fixed frame period (FFP) configuration of the serving cell, a reference signal timing configuration for at least one neighbor cell and system frame number (SFN) and frame timing difference reporting information for the at least one neighbor cell. The method may also include determining whether there is transmission from the serving cell during a period of time and, in accordance with a determination that there is no transmission from the serving cell during the period of time, based at least on the assistance information, performing measurement of the at least one neighbor cell during the period of time.

In one embodiment, the measurement of the at least one neighbor cell may include at least one of the following: measurement of at least one reference signal of the at least one neighbor cell, and/or measurement of SFN and frame timing difference of the at least one neighbor cell.

In one embodiment, the determination of whether there is transmission from the serving cell during the period of time may include determining whether there is transmission at a start of a FFP, where the period of time comprises the FFP.

In one embodiment, the period of time may be outside at least one configured measurement gap occasion.

In one embodiment, the method may further include receiving information on whether the serving cell supports the measurement of the at least one neighbor cell outside the at least one configured measurement gap occasion and/or supports cancellation or deactivation of at least one of the at least one configured measurement gap occasion.

In one embodiment, when one or more measurements of the at least one neighbor cell are performed outside the at least one configured measurement gap occasion, the method may include canceling or deactivating the at least one of the at least one configured measurement gap occasion subsequent to the one or more measurements.

In one embodiment, the method may also include receiving criteria on when the user equipment monitors scheduling information for data transmission from the serving cell during the at least one configured measurement gap occasion.

In one embodiment, the criteria may include at least a number of the measurement of the at least one neighbor cell outside the at least one configured measurement gap occasion.

In one embodiment, the criteria may be determined by the serving cell based at least on at least one of the following: signal strength of the serving cell, signal strength of the at least one neighbor cell, reference signal received quality of the serving cell, and/or configured 5G quality of service identifier (5QI) user equipment sessions.

In one embodiment, when the one or more measurements of the at least one neighbor cell are performed outside the at least one configured measurement gap occasion, and when the serving cell supports the measurement of the at least one neighbor cell outside the at least one configured measurement gap occasion and/or supports the cancellation or deactivation of the at least one of the at least one configured measurement gap occasion and when the criteria is fulfilled, the method may include monitoring for the scheduling information for the data transmission from the serving cell during the at least one of the at least one configured measurement gap occasion subsequent to the one or more measurements.

In one embodiment, when one or more measurements of the at least one neighbor cell are performed outside the at least one configured measurement gap occasion, the method may include changing a priority between intra-frequency and inter-frequency measurements during at least one of the at least one configured measurement gap occasion subsequent to the one or more measurements.

In one embodiment, when the serving cell does not support the measurement of the at least one neighbor cell outside the at least one configured measurement gap occasion and/or does not support the cancellation or deactivation of the at least one of the at least one configured measurement gap occasion, the method may include modifying, by the user equipment, its gap sharing priority between intra-frequency and inter-frequency measurements based on the measurement of the at least one neighbor cell.

In one embodiment, the method may further include transmitting, to the serving cell, an indication indicating capability to support the measurement of the at least one neighbor cell outside the at least one configured measurement gap occasion.

In one embodiment, the performing of the measurement of the at least one neighbor cell may include at least one of: performing inter-frequency measurements of the at least one neighbour cell, and/or performing intra-frequency measurements of the at least one neighbour cell.

Another embodiment may be directed to an apparatus including at least one processor and at least one memory comprising computer program code. The at least one memory and computer program code configured, with the at least one processor, to cause the apparatus at least to perform: receiving, from a serving cell, assistance information that may include at least one of a fixed frame period (FFP) configuration of the serving cell, a reference signal timing configuration for at least one neighbor cell and system frame number (SFN) and frame timing difference reporting information for the at least one neighbor cell. The apparatus may be further caused to perform: determining whether there is transmission from the serving cell during a period of time and, in accordance with a determination that there is no transmission from the serving cell during the period of time, based at least on the assistance information, performing measurement of the at least one neighbor cell during the period of time.

In an embodiment, the measurement of the at least one neighbor cell may include at least one of the following: measurement of at least one reference signal of the at least one neighbor cell, and/or measurement of SFN and frame timing difference of the at least one neighbor cell.

In an embodiment, the determination of whether there is transmission from the serving cell during the period of time may include determining whether there is transmission at a start of a FFP, where the period of time comprises the FFP. In an embodiment, the period of time may be outside at least one configured measurement gap occasion.

In an embodiment, the at least one memory and computer program code are configured, with the at least one processor, to cause the apparatus at least to perform: receiving information on whether the serving cell supports the measurement of the at least one neighbor cell outside the at least one configured measurement gap occasion and/or supports cancellation or deactivation of at least one of the at least one configured measurement gap occasion.

In an embodiment, when one or more measurements of the at least one neighbor cell are performed outside the at least one configured measurement gap occasion, the at least one memory and computer program code are configured, with the at least one processor, to cause the apparatus at least to perform: canceling or deactivating the at least one of the at least one configured measurement gap occasion subsequent to the one or more measurements.

In an embodiment, the at least one memory and computer program code are configured, with the at least one processor, to cause the apparatus at least to perform: receiving criteria on when the apparatus monitors scheduling information for data transmission from the serving cell during the at least one configured measurement gap occasion.

In an embodiment, the criteria may include at least a number of the measurement of the at least one neighbor cell outside the at least one configured measurement gap occasion. In an embodiment, the criteria is determined by the serving cell based at least on at least one of the following: signal strength of the serving cell, signal strength of the at least one neighbor cell, reference signal received quality of the serving cell, and/or configured 5G quality of service identifier (5QI) user equipment sessions.

In an embodiment, when the one or more measurements of the at least one neighbor cell are performed outside the at least one configured measurement gap occasion, and when the serving cell supports the measurement of the at least one neighbor cell outside the at least one configured measurement gap occasion and/or supports the cancellation or deactivation of the at least one of the at least one configured measurement gap occasion and when the criteria is fulfilled, the at least one memory and computer program code are configured, with the at least one processor, to cause the apparatus at least to perform: monitoring for the scheduling information for the data transmission from the serving cell during the at least one of the at least one configured measurement gap occasion subsequent to the one or more measurements.

In an embodiment, when one or more measurements of the at least one neighbor cell are performed outside the at least one configured measurement gap occasion, the at least one memory and computer program code are configured, with the at least one processor, to cause the apparatus at least to perform: changing a priority between intra-frequency and inter-frequency measurements during at least one of the at least one configured measurement gap occasion subsequent to the one or more measurements.

In an embodiment, when the serving cell does not support the measurement of the at least one neighbor cell outside the at least one configured measurement gap occasion and/or does not support the cancellation or deactivation of the at least one of the at least one configured measurement gap occasion, the at least one memory and computer program code are configured, with the at least one processor, to cause the apparatus at least to perform: modifying the apparatus' gap sharing priority between intra-frequency and inter-frequency measurements based on the measurement of the at least one neighbor cell.

In an embodiment, the at least one memory and computer program code are configured, with the at least one processor, to cause the apparatus at least to perform: transmitting, to the serving cell, an indication indicating capability to support the measurement of the at least one neighbor cell outside the at least one configured measurement gap occasion.

In an embodiment, the at least one memory and computer program code are configured, with the at least one processor, to cause the apparatus at least to perform at least one of: performing inter-frequency measurements of the at least one neighbour cell, and/or performing intra-frequency measurements of the at least one neighbour cell.

Another embodiment may be directed to an apparatus including means for receiving, from a serving cell, assistance information that may include at least one of a fixed frame period (FFP) configuration of the serving cell, a reference signal timing configuration for at least one neighbor cell and system frame number (SFN) and frame timing difference reporting information for the at least one neighbor cell. The apparatus may also include means for determining whether there is transmission from the serving cell during a period of time and, in accordance with a determination that there is no transmission from the serving cell during the period of time, based at least on the assistance information, means for performing measurement of the at least one neighbor cell during the period of time.

In one embodiment, the measurement of the at least one neighbor cell comprises at least one of the following: measurement of at least one reference signal of the at least one neighbor cell, and/or measurement of SFN and frame timing difference of the at least one neighbor cell.

In one embodiment, the determination of whether there is transmission from the serving cell during the period of time may include means for determining whether there is transmission at a start of a FFP, where the period of time comprises the FFP. In one embodiment, the period of time may be outside at least one configured measurement gap occasion.

In one embodiment, the apparatus may also include means for receiving information on whether the serving cell supports the measurement of the at least one neighbor cell outside the at least one configured measurement gap occasion and/or supports cancellation or deactivation of at least one of the at least one configured measurement gap occasion.

In one embodiment, when one or more measurements of the at least one neighbor cell are performed outside the at least one configured measurement gap occasion, the apparatus comprises: means for canceling or deactivating the at least one of the at least one configured measurement gap occasion subsequent to the one or more measurements.

In one embodiment, the apparatus may also include means for receiving criteria on when the apparatus monitors scheduling information for data transmission from the serving cell during the at least one configured measurement gap occasion.

In one embodiment, the criteria may include at least a number of the measurement of the at least one neighbor cell outside the at least one configured measurement gap occasion.

In one embodiment, the criteria may be determined by the serving cell based at least on at least one of the following: signal strength of the serving cell, signal strength of the at least one neighbor cell, reference signal received quality of the serving cell, and/or configured 5G quality of service identifier (5QI) user equipment sessions.

In one embodiment, when the one or more measurements of the at least one neighbor cell are performed outside the at least one configured measurement gap occasion, and when the serving cell supports the measurement of the at least one neighbor cell outside the at least one configured measurement gap occasion and/or supports the cancellation or deactivation of the at least one of the at least one configured measurement gap occasion and when the criteria is fulfilled, the apparatus may include: means for monitoring for the scheduling information for the data transmission from the serving cell during the at least one of the at least one configured measurement gap occasion subsequent to the one or more measurements.

In one embodiment, when one or more measurements of the at least one neighbor cell are performed outside the at least one configured measurement gap occasion, the apparatus may include: means for changing a priority between intra-frequency and inter-frequency measurements during at least one of the at least one configured measurement gap occasion subsequent to the one or more measurements.

In one embodiment, when the serving cell does not support the measurement of the at least one neighbor cell outside the at least one configured measurement gap occasion and/or does not support the cancellation or deactivation of the at least one of the at least one configured measurement gap occasion, the apparatus may include: means for modifying the apparatus' gap sharing priority between intra-frequency and inter-frequency measurements based on the measurement of the at least one neighbor cell.

In one embodiment, the apparatus may further include means for transmitting, to the serving cell, an indication indicating capability to support the measurement of the at least one neighbor cell outside the at least one configured measurement gap occasion.

In one embodiment, the apparatus may include at least one of: means for performing inter-frequency measurements of the at least one neighbour cell, and/or means for performing intra-frequency measurements of the at least one neighbour cell.

Another embodiment may be directed to a method including transmitting, to a user equipment assistance information that may include at least one of a fixed frame period (FFP) configuration of a serving cell, a reference signal timing configuration for at least one neighbor cell and system frame number (SFN) and frame timing difference reporting information for the at least one neighbor cell.

In an embodiment, the method may also include transmitting information on whether the serving cell supports measurement of the at least one neighbor cell outside at least one configured measurement gap occasion and/or supports cancellation or deactivation of at least one of the at least one configured measurement gap occasion.

In an embodiment, the measurement of the at least one neighbor cell may include at least one of the following: measurement of at least one reference signal of the at least one neighbor cell, and/or measurement of SFN and frame timing difference of the at least one neighbor cell.

In an embodiment, the method may further include receiving from the user equipment indication indicating capability to support the measurement of the at least one neighbor cell outside the at least one configured measurement gap occasion.

In an embodiment, when the user equipment is capable of supporting the measurement of the at least one neighbor cell outside the at least one configured measurement gap occasion, the method may further include determining whether there is transmission to the user equipment during a period of time and, in accordance with a determination that there is no transmission during the period of time, based at least on the assistance information, determining whether to transmit scheduling information for data transmission to the user equipment during the at least one configured measurement gap occasion subsequent to the period of time.

In an embodiment, the determination of whether there is transmission to the user equipment during the period of time may include: determining whether there is transmission at a start of a FFP, where the period of time comprises the FFP. In an embodiment, the period of time may be outside the at least one configured measurement gap occasion.

In an embodiment, when the user equipment is capable of supporting the measurement of the at least one neighbor cell outside the at least one configured measurement gap occasion, the method may further include: providing, to the user equipment, criteria on when to transmit scheduling information for data transmission to the user equipment outside the at least one configured measurement gap occasion and, when the criteria is fulfilled, transmitting the scheduling information for the data transmission to the user equipment during the at least one configured measurement gap occasion.

In an embodiment, the criteria may include at least a number of the measurement of the at least one neighbor cell outside the at least one configured measurement gap occasion. In an embodiment, the criteria may be determined based at least on at least one of the following: signal strength of the serving cell, signal strength of the at least one neighbor cell, reference signal received quality of the serving cell, and/or configured 5G quality of service identifier (5QI) user equipment sessions.

Another embodiment may be directed to an apparatus including at least one processor and at least one memory comprising computer program code. The at least one memory and computer program code configured, with the at least one processor, to cause the apparatus at least to perform: transmitting, to a user equipment, assistance information that may include at least one of a fixed frame period (FFP) configuration of a serving cell, a reference signal timing configuration for at least one neighbor cell and system frame number (SFN) and frame timing difference reporting information for the at least one neighbor cell.

In one embodiment, the at least one memory and computer program code are configured, with the at least one processor, to cause the apparatus at least to perform: transmitting information on whether the serving cell supports measurement of the at least one neighbor cell outside at least one configured measurement gap occasion and/or supports cancellation or deactivation of at least one of the at least one configured measurement gap occasion.

In one embodiment, the measurement of the at least one neighbor cell may include at least one of the following: measurement of at least one reference signal of the at least one neighbor cell, and/or measurement of SFN and frame timing difference of the at least one neighbor cell.

In one embodiment, the at least one memory and computer program code are configured, with the at least one processor, to cause the apparatus at least to perform: receiving from the user equipment indication indicating capability to support the measurement of the at least one neighbor cell outside the at least one configured measurement gap occasion.

In one embodiment, when the user equipment is capable of supporting the measurement of the at least one neighbor cell outside the at least one configured measurement gap occasion, the at least one memory and computer program code are configured, with the at least one processor, to cause the apparatus at least to perform: determining whether there is transmission to the user equipment during a period of time and, in accordance with a determination that there is no transmission during the period of time, based at least on the assistance information, determining whether to transmit scheduling information for data transmission to the user equipment during the at least one configured measurement gap occasion subsequent to the period of time.

In one embodiment, the determination of whether there is transmission to the user equipment during the period of time may include determining whether there is transmission at a start of a FFP, where the period of time comprises the FFP. In one embodiment, the period of time may be outside the at least one configured measurement gap occasion.

In one embodiment, when the user equipment is capable of supporting the measurement of the at least one neighbor cell outside the at least one configured measurement gap occasion, the at least one memory and computer program code are configured, with the at least one processor, to cause the apparatus at least to perform: providing, to the user equipment, criteria on when to transmit scheduling information for data transmission to the user equipment outside the at least one configured measurement gap occasion and, when the criteria is fulfilled, transmitting the scheduling information for the data transmission to the user equipment during the at least one configured measurement gap occasion.

In one embodiment, the criteria may include at least a number of the measurement of the at least one neighbor cell outside the at least one configured measurement gap occasion. In one embodiment, the criteria may be determined based at least on at least one of the following: signal strength of the serving cell, signal strength of the at least one neighbor cell, reference signal received quality of the serving cell, and/or configured 5G quality of service identifier (5QI) user equipment sessions.

Another embodiment may be directed to an apparatus including means for transmitting, to a user equipment, assistance information that may include at least one of a fixed frame period (FFP) configuration of a serving cell, a reference signal timing configuration for at least one neighbor cell and system frame number (SFN) and frame timing difference reporting information for the at least one neighbor cell.

In an embodiment, the apparatus may further include means for transmitting information on whether the serving cell supports measurement of the at least one neighbor cell outside at least one configured measurement gap occasion and/or supports cancellation or deactivation of at least one of the at least one configured measurement gap occasion.

In an embodiment, the measurement of the at least one neighbor cell may include at least one of the following: measurement of at least one reference signal of the at least one neighbor cell, and/or measurement of SFN and frame timing difference of the at least one neighbor cell.

In an embodiment, the apparatus may also include means for receiving, from the user equipment, an indication indicating capability to support the measurement of the at least one neighbor cell outside the at least one configured measurement gap occasion.

In an embodiment, when the user equipment is capable of supporting the measurement of the at least one neighbor cell outside the at least one configured measurement gap occasion, the apparatus may include: means for determining whether there is transmission to the user equipment during a period of time and, in accordance with a determination that there is no transmission during the period of time, based at least on the assistance information, means for determining whether to transmit scheduling information for data transmission to the user equipment during the at least one configured measurement gap occasion subsequent to the period of time.

In an embodiment, the method for determining whether there is transmission to the user equipment during the period of time may include means for determining whether there is transmission at a start of a FFP, where the period of time comprises the FFP. In an embodiment, the period of time may be outside the at least one configured measurement gap occasion.

In an embodiment, when the user equipment is capable of supporting the measurement of the at least one neighbor cell outside the at least one configured measurement gap occasion, the apparatus may include: means for providing, to the user equipment, criteria on when to transmit scheduling information for data transmission to the user equipment outside the at least one configured measurement gap occasion and, when the criteria is fulfilled, means for transmitting the scheduling information for the data transmission to the user equipment during the at least one configured measurement gap occasion.

In an embodiment, the criteria may include at least a number of the measurement of the at least one neighbor cell outside the at least one configured measurement gap occasion. In an embodiment, the criteria may be determined based at least on one or more of the following: signal strength of the serving cell, signal strength of the at least one neighbor cell, reference signal received quality of the serving cell, and/or configured 5G quality of service identifier (5QI) user equipment sessions.

BRIEF DESCRIPTION OF THE DRAWINGS

For proper understanding of example embodiments, reference should be made to the accompanying drawings, wherein:

FIG. 1 illustrates an example diagram of a fixed frame period;

FIG. 2 illustrates an example block diagram of inter-frequency measurements;

FIG. 3 illustrates an example measurement gap sharing table, according to an embodiment;

FIG. 4 illustrates an example table displaying different gap patterns and potential overhead gain, according to some example embodiments;

DETAILED DESCRIPTION

Figure 5:
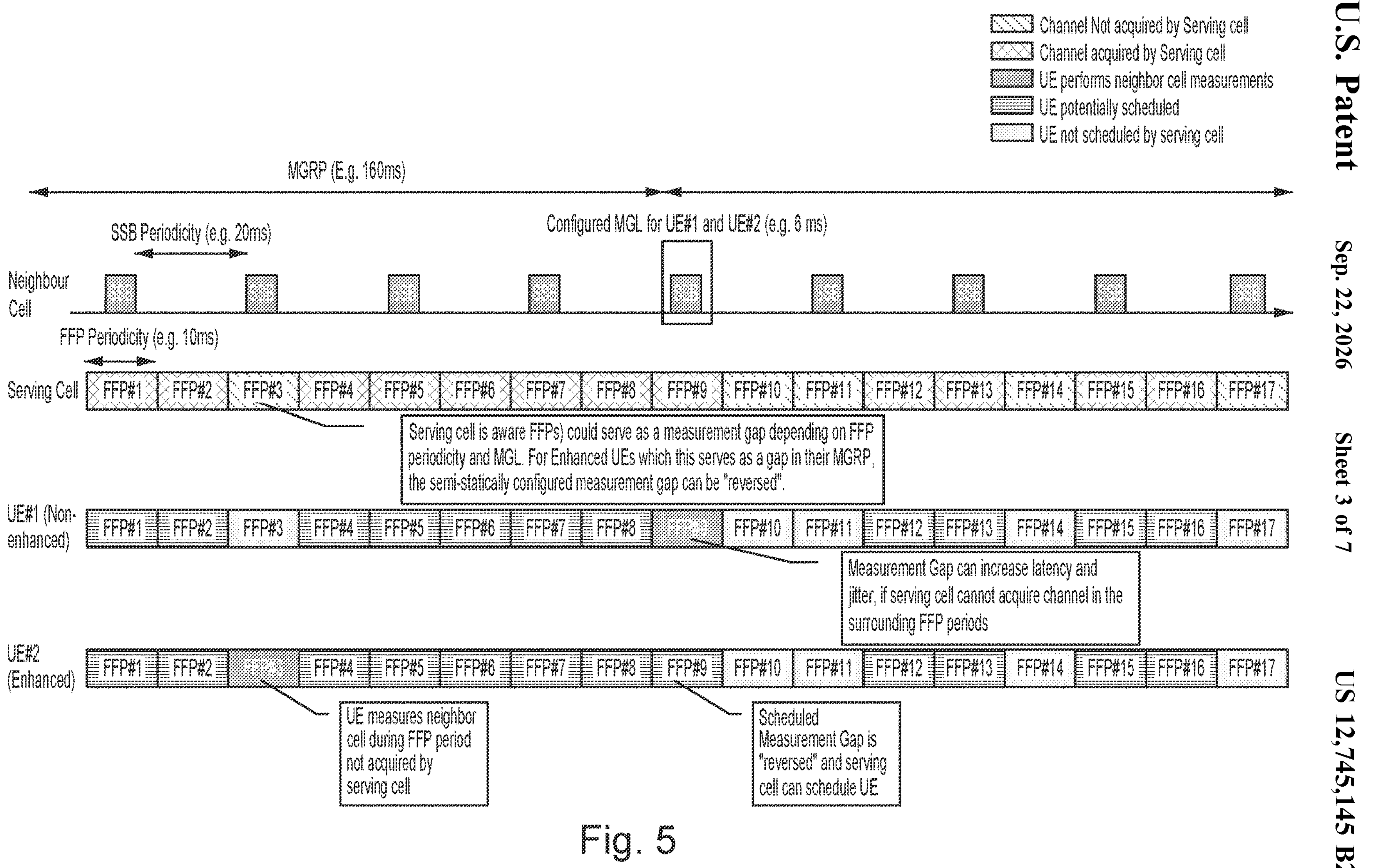
FIG. 5 illustrates an example of FBE unconfigured measurement gap handling, according to certain example embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for handling measurement gaps for frame based equipment (FBE) operation, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

When operating in unlicensed spectrum, one allowed channel access mechanism is the so-called frame based equipment (FBE), which in 3GPP is also specified as semi-static channel occupancy. Channel access with FBE is based on the definition of a fixed frame period (FFP), as illustrated in the example of FIG. 1. According to regulations, the FFP is to be within the range of 1 ms to 10 ms. Transmissions can start only at the beginning of an FFP. An equipment may change its FFP, but should not change its FFP more often than once every 200 ms. Immediately before starting transmissions on an operating channel at the start of an FFP, the initiating device shall perform a clear channel assessment (CCA) check (i.e., Listen-Before-Talk operation) during a single observation slot (9 μs). The operating channel can be considered occupied if the energy level in the channel exceeds the energy detection (ED) threshold level. If the initiating device finds the operating channel(s) to be clear, it may transmit immediately. If the initiating device finds an operating channel occupied, then there shall be no transmissions on that channel during the next FFP. A gNB may indicate the FBE configuration in system information block 1 (SIB-1). The fixed frame period may be restricted to values of {1 ms, 2 ms, 2.5 ms, 4 ms, 5 ms, 10 ms}. These values include the idle period, which is equal to either 5% of the FFP duration or 100 μs, whatever is the largest.

FIG. 2 illustrates examples of inter-frequency measurements. In NR, a measurement is considered as inter-frequency unless the center frequency of the synchronization signal block (SSB) of the serving cell configuring the measurements and the center frequency of the SSB of the neighbour cell(s) to be measured are the same, and the subcarrier spacing of the two SSBs are the same.

Measurement gaps may be shared for intra and inter-frequency measurements (e.g., see 3GPP TS 38.133 and 38.331). For UE's which require to share the measurement gaps for intra and inter-frequency measurements, the UE can be provided a parameter, MeasGapSharingScheme, by the network that determines the priority between these measurements. FIG. 3 illustrates an example of the measurement gap sharing scheme parameter.

For NR standalone UE without NR-dual connectivity (DC) operation and configured with per-UE measurement gap, measurement gap sharing may be applied when the UE requires measurement gaps to identify and measure cells on intra-frequency carriers or when SMTC configured for intra-frequency measurement are fully overlapping with per-UE measurement gaps, and when the UE is configured to identify and measure cells on inter-frequency carriers, and/or inter-RAT E-UTRAN carriers and/or inter-RAT UTRAN carriers for SRVCC. When the network signals "01", "10" or "11" with RRC parameter MeasGapSharingScheme, the value of X is defined as in FIG. 3, and Kintra=1/X*100, Kinter=1/(100−X)*100. When the network signals "00" indicating equal splitting gap sharing, X is not applied.

Inter-frequency and inter-RAT measurements may be needed for mobility, positioning, load balancing and/or other purposes. Based on capabilities, UEs may require measurement gaps to perform inter-frequency or inter-RAT measurements or even intra-frequency measurements.

Measurement gaps may be semi-statically configured by the gNB per UE. Measurement gaps imply that the UEs should not be scheduled during the gap duration. Gaps in scheduling can lead to lower spectral efficiency and impact end user performance, for example, resulting in lower throughputs and increased latency and/or jitter, which can be especially detrimental to URLLC.

Additionally, it should be noted that, in unlicensed band, the serving cell may not always acquire the channel; hence, the delay in scheduling a UE is also increased further when these are configured with measurement gaps, adding more uncertainty to the delay/jitter of the provided service.

FIG. 4 illustrates examples of the different gap patterns defined by 3GPP. Each gap pattern ID provides the UE with measurement gap length (MGL) and/or measurement gap repetition period (MGRP). MGL refers to the period during which the UE is performing measurements and therefore is not eligible for scheduling. MGRP establishes the frequency with which MGLs will be available to the UE for measurements. The last column depicted in the table in FIG. 4 displays the overhead incurred from activating the measurement gaps for the different gap pattern IDs. This overhead may also represent examples of the possible upper bound of the potential gain a system might achieve if it could avoid some or all of the measurement gaps, according to certain embodiments.

Some example embodiments may be configured to employ the deterministic nature of the FBE operation and a UE's measurement gap configuration to provide a framework where the UE can perform measurements during FFPs in which the serving cell does not acquire the channel. Additionally, in an embodiment, if there is an occasion where the UE can perform a measurement prior to its configured MGL within a MGRP, the UE may be eligible for scheduling during the next MGL of that MGRP (i.e., the next MGL of that MGRP can be automatically cancelled or deactivated).

In certain embodiments, for FBE operation, depending on the FFP periodicity, as well as the measurement gap configuration and neighbor cell SSB periodicity, when the serving cell does not acquire the channel for the duration of an FFP, the UE can employ the extended idle period (e.g., lasting at least until the end of the current FFP) to perform measurements. It is noted that the extended idle period may refer to the case where the serving cell (e.g., gNB) is not transmitting for the entire duration of an FFP, such that the idle period of the previous FFP is extended. According to some embodiments, the UE and serving cell may be implicitly be aware that this extended idle period is employed for measurements and can thereby avoid the need for at least the next configured measurement gap occasion. In the following description and claims, to perform measurement outside the configured measurement gap occasion and/or to cancel or deactivate at least one of configured measurement gap occasion subsequent to the measurement is referred to as enhanced or unconfigured measurement gap. If the gNB does not support the capability for enhanced or unconfigured measurement gap, i.e., capability of canceling or deactivating configured measurement gap occasions, a UE can still perform measurements during a period of time, for example, outside the configured measurement gap occasion or during the extended idle periods (i.e., the FFPs in which the UE's serving cell fails to acquire the channel) and/or modify gap sharing based on measurements the UE was able to perform in the period of time.

FIG. 5 depicts an example of how the unconfigured measurement gap handling would work for FBE operation. In the example of FIG. 5, two different UEs are considered: UE #1 is a UE with normal functionality, and UE #2 is a UE enhanced with the functionality described herein according to certain embodiments. Both UEs are configured to perform measurements of a neighbour cell in a measurement gap (MG) occasion that is scheduled to occur during FFP #9. At least for the duration of the MG occasion in FFP #9, the serving cell does not schedule UE #1 to allow it to perform the mentioned measurements.

For UE #2, there was an occasion within the UE configured MGRP between two consecutive measurement gap occasions in which the serving cell failed to acquire the channel and did not perform transmission to UE #2, FFP #3. Here, UE #2's enhanced functionality permitted it to perform the measurements of the neighbour cell. The serving cell is aware of when it acquires the channel. It may also be assumed that the serving cell knows when the neighbour cells, which the UE is configured to measure, transmit their SSBs. Therefore, the serving cell is also aware that the UE had a chance to perform measurements within the MGRP between two consecutive measurement gap occasions, and hence the second pre-configured measurement gap occasion of the two consecutive measurement gap occasions is no longer required. Based on this, during the MG occasion in FFP #9, UE #2 is eligible to be scheduled by the serving cell. It is assumed that the transmission of SSBs by neighbour cells is more frequent than the occurrence of MG occasions, and that the UE is also aware of the timing of transmission of SSBs by neighbour cells, outside the configured MG occasions. In one possible embodiment, the UE may determine the time of transmission of SSBs by inter-frequency neighbour cells implicitly based on its serving cell (intra-frequency) SSB measurement timing configuration (SMTC). Alternatively, this information may be provided to the UE with the MG configuration.

It should be noted that there may be a transient period based on the time the UE requires to detect the channel is not acquired by its serving cell and the time required to tune to the neighbour cell frequency. This could lead to UE missing out on some SSBs of the neighbour cell, especially if those are configured to be transmitted at the start of the serving cell FFP. However, NR-U SSB quasi-co-location (QCL) feature could be employed, cell planning could be performed to avoid SSB transmissions at the start of the FFP, and/or an approach could be employed that uses CSI-RS based measurements. As an example, the UE may be configured with CSI-RS for inter-frequency neighbour cell measurements. These CSI-RS may be configured so that they do not collide with the start of the UE's serving cell FFP, and that they appear at least once outside of the UE's configured MG occasions. In this way, when the UE determine the serving gNB is not transmitting during one FFP, it can tune to the configured CSI-RS to perform inter-frequency measurements.

Figure 6:
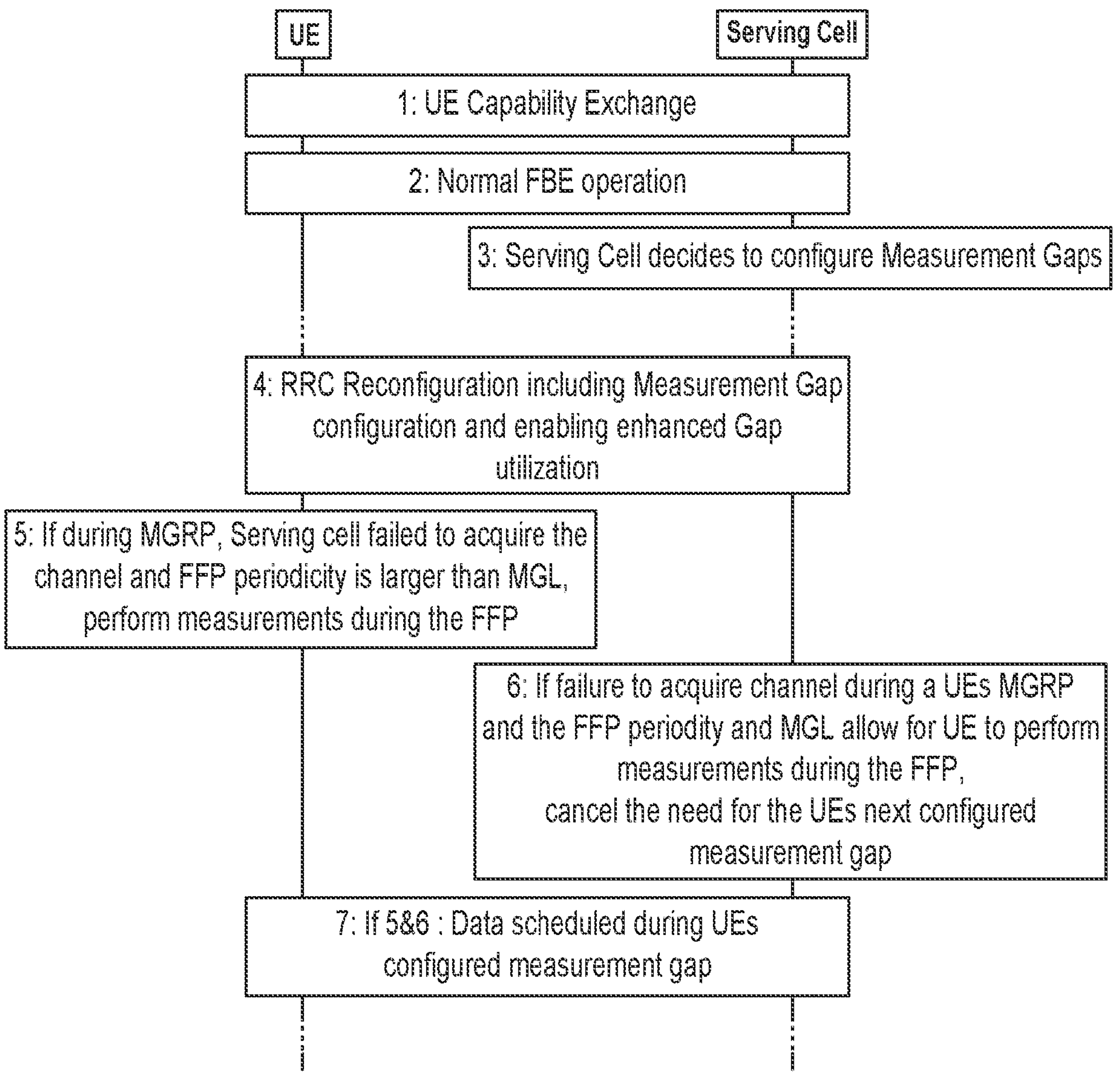
FIG. 6 illustrates an example signaling diagram, according to some example embodiments.

FIG. 6 illustrates an example message sequence diagram for a scenario in which the UE and serving cell support the unconfigured measurement gap handling procedure for FBE operation, according to one embodiment. As introduced above, unconfigured measurement gap handling may include the ability to cancel or deactivate pre-configured measurement gap occasions (i.e., the UE is available for scheduling). Additionally or alternatively, unconfigured measurement gap handling may include the ability to, if the MG occasion is not going to be canceled or deactivated, re-prioritize intra-frequency and inter-frequency measurements based on SSB timing and measurement gap occasions configured. In certain embodiments, the UE's unconfigured measurement gap handling may be applicable even when the serving cell (e.g., gNB) is not aware of the UE's capability for unconfigured measurement gaps or when the serving cell does not support unconfigured measurement gap handling.

As illustrated in the example of FIG. 6, at 1, the UE may inform the serving cell of its support for the unconfigured measurement gap handling capability. At 2, normal 3GPP FBE operation may be employed for data exchange between the UE and serving cell. At 3, the serving cell may decide that it needs to configure the UE with measurement gaps. At 4, the serving cell may provide the UE with at least a measurement gap ID and may inform the UE whether the serving cell supports unconfigured measurement gap handling, e.g., via RRC reconfiguration procedure. In one example, at 4, the serving cell may also provide assistance information on the reference signals configuration to be used to perform measurements outside the configured measurement gaps. In another example, the assistance information may include the reference signal timing configuration for at least one neighbor cell and system frame number (SFN) and frame timing difference reporting information for the at least one neighbor cell. At 5, based on the UE configured MGL, the FFP periodicity, and knowledge of when neighbour cells transmit their SSBs, or other reference signals that the UE may use to perform the measurements, the UE may attempt to perform neighbour cell measurements during the FFP in which the serving cell fails to acquire the channel (i.e., the extended idle period) and does not perform transmission to the UE. If the UE had an opportunity to perform measurements in these scenarios within a MGRP in between two consecutive measurement gap occasions and if the serving cell supports unconfigured measurement gap handling, then during the second configured MG occasion of the two consecutive measurement gap occasions, the UE shall be available for scheduling. For example, at 6, if the serving cell fails to acquire the channel during a UEs MGRP in between two consecutive measurement gap occasions and does not perform transmission to the UE, and the FFP periodicity and the MGL allow for the UE to perform measurements during the FFP in which the serving cell has failed to acquire the channel and has not performed transmission to the UE, then the need for the UE's next configured measurement gap occasion may be cancelled. At 7, data may be scheduled during the UE's configured measurement gap occasion. In an embodiment, if the serving cell does not support unconfigured measurement gap handling, the UE may modify its gap sharing priority between intra and inter-frequency measurements based on the measurement it performed outside the configured measurement gap occasion.

Figure 7:
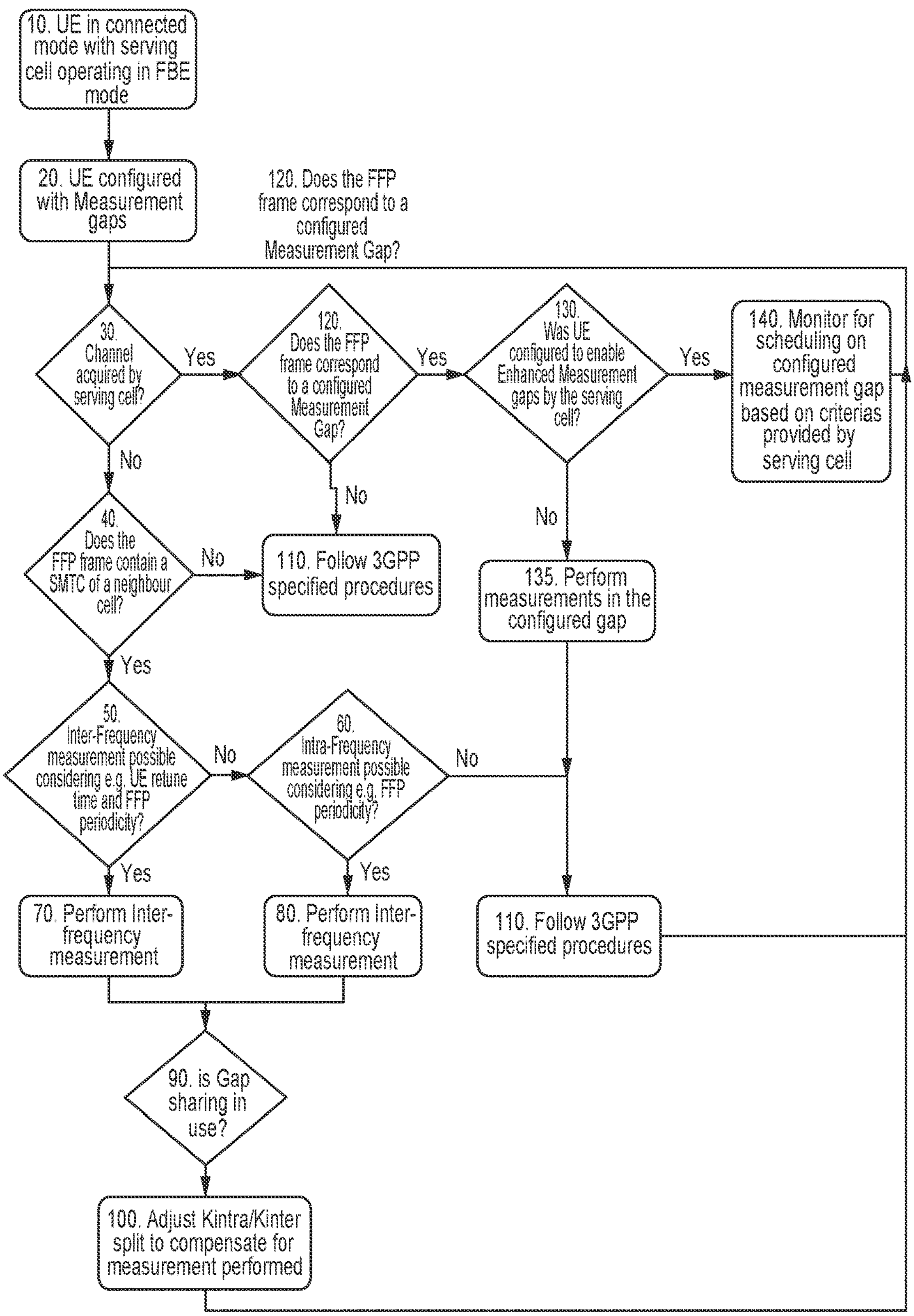
FIG. 7 illustrates an example flow diagram of a method, according to an example embodiment.

FIG. 7 illustrates an example flow chart depicting a method for a UE supporting unconfigured measurement gap handling, according to an example embodiment. In certain example embodiments, the flow diagram of FIG. 7 may be performed by a network entity or network node in a communications system, such as LTE or 5G NR. For instance, in some example embodiments, the network entity performing the method of FIG. 7 may include a UE, SL UE, mobile station, IoT device, UE type of road side unit (RSU), other stationary or portable device, or the like. In one embodiment, the network node performing the method of FIG. 7 may include a UE, such as the UE illustrated in the example of FIG. 6, or other similar device. Therefore, the method of FIG. 7 may include one or more operations also illustrated in the example of FIG. 6.

As illustrated in the example of FIG. 7, at 10, a UE is in RRC connected mode with a serving cell that operates in FBE mode. At 20, the UE may be configured with measurement gaps to allow it to measure one or more neighbour cells. At 30, the UE may check whether the channel was acquired by the serving cell or whether there is transmission from the serving cell. If it is determined at 30 that the channel is not acquired by the serving cell or there is no transmission from the serving cell at the start of an FFP, then, at 40, the UE may verify whether the current FFP overlaps with the transmission of SSBs (or any other configured reference signal for neighbor cell measurements) by the neighbour cell it has to measure. In the example of FIGS. 7, at 50 and 60, the UE may prioritize inter-frequency neighbour cell measurements over intra-frequency, e.g., based on the current FFP duration that allows for larger frequency re-tuning time. The priority of the measurements between intra- and inter-frequency can, however, be modified based on other criteria, such as the reason for the measurements: e.g., optimization (ANR) vs handover. At 70 and 80, the UE may perform the neighbour cell measurements. At 90, if measurement gap sharing is employed, the UE may adjust the priority between intra- and inter-frequency measurements based on the measurements it has been capable of performing outside the configured measurement gap occasions.

In some embodiments, the UE may perform SFN and Frame Timing Difference (SFTD) measurements instead of neighbor cell reference signal measurements outside the configured measurement gap occasions.

As further illustrated in the example of FIG. 7, if it is determined that the channel is acquired by the serving cell or there is transmission from the serving cell at 30, the UE may verify, at 120, whether the current FFP overlaps with a configured MG. If it does not, the UE may follow normal standardized procedures at 110. If it does, and it is determined at 130 that the UE was able to perform measurements during a previous unconfigured measurement gap (e.g., at 70 and/or 80), then the UE may, at 140, monitor physical downlink control channel (PDCCH) during the MGL in case it is scheduled by the serving cell based on criteria set by the serving cell. These criteria may, for example, comprises a number of measurements performed outside the configured gap occasions that were available to the UE and the gNB could provide different values depending on the signal strength of the serving cell and the neighbor cells, the reference signal received quality (RSRQ) of the serving cell and the active UE 5QI sessions.

Figure 8:
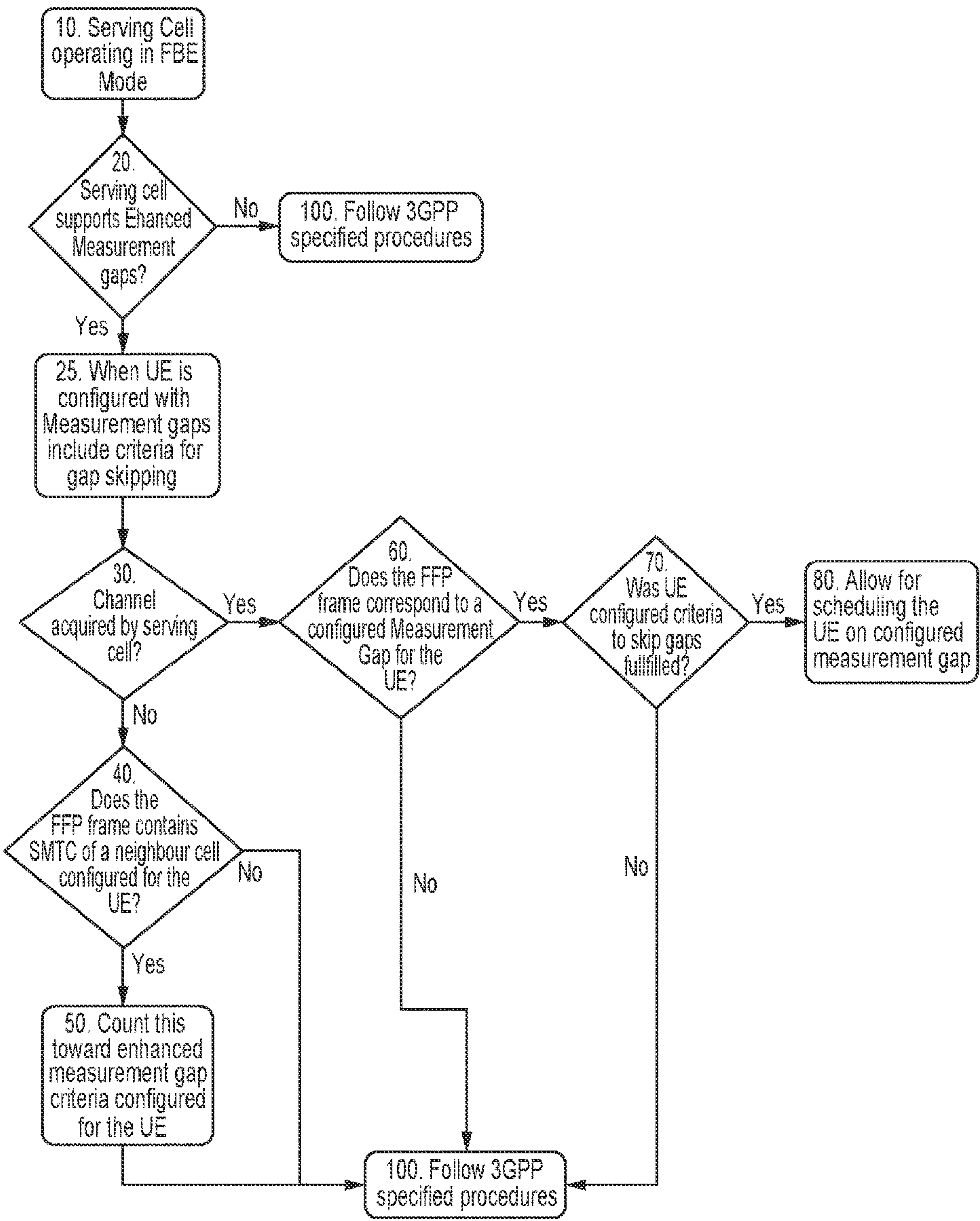
FIG. 8 illustrates an example flow diagram of a method, according to an example embodiment.

FIG. 8 illustrates an example flow chart depicting a method for enabling unconfigured measurement gap handling, according to an example embodiment. In certain example embodiments, the flow diagram of FIG. 8 may be performed by a network entity or network node in a communications system, such as LTE or 5G NR. In some example embodiments, the network entity performing the method of FIG. 8 may include or be included in a base station, access node, node B, eNB, gNB, NG-RAN node, transmission-reception points (TRPs), high altitude platform stations (HAPS), relay station or the like. In one embodiment, the network node performing the method of FIG. 8 may include a serving network node, serving gNB, or serving cell, such as the serving cell illustrated in the example of FIG. 6, or similar radio node. Therefore, the method of FIG. 8 may include one or more operations illustrated in the example of FIG. 6.

As illustrated in the example of FIG. 8, at 10, a cell may be operating in FBE mode and, at 20, it may be determined if the cell supports the unconfigured measurement gap handling for UEs supporting this feature. If so, at 25, the serving cell may provide the UE with the criteria upon which the UE should be available for scheduling during configured measurement gap occasions. These criteria may, for example, comprises a number of measurements performed outside the configured gap occasions that were available to the UE, and gNB may provide different values depending on the signal strength of the serving cell and the neighbor cells, the reference signal received quality (RSRQ) of the serving cell and the active UE 5QI sessions. In an embodiment, the serving cell may also provide assistance information on the timing and type of reference signals that the UE should use to perform measurements outside the configured measurement gaps. In one example, the assistance information may include reference signal timing configuration for at least one neighbor cell and system frame number (SFN) and frame timing difference reporting information for the at least one neighbor cell.

In some embodiments, the serving cell may keep track of FFP in which it fails to acquire the channel and does not perform transmission to the UE and which contains at least one neighbour cell measurement occasion for the UE. For example, at 30, it may be determined whether the channel was acquired by the serving cell and, if not, it may be determined, at 40, if the FFP frame contains a SMTC occasion configured to the UE for neighbour cell measurements. At 50, each of these unconfigured gap occasions may count towards the criteria provided to the UE at 25.

As further illustrated in the example of FIG. 8, when it is determined, at 30, that the serving cell acquires the channel or performs transmission to the UE, it may then be determined, at 60, whether the FFP contains a configured measurement gap occasion for the UE. If not, the serving cell may decide to follow normal standardized procedures at 100. If it is determined that the FFP contains a configured measurement gap occasion for the UE, based on the fulfilment of the criteria to cancel or deactivate measurement gap occasion determined at 70, the serving cell may decide whether to schedule the UE on the configured measurement gap occasion at 80 or follow standardized procedures at 100.

Figures 9A, 9B:
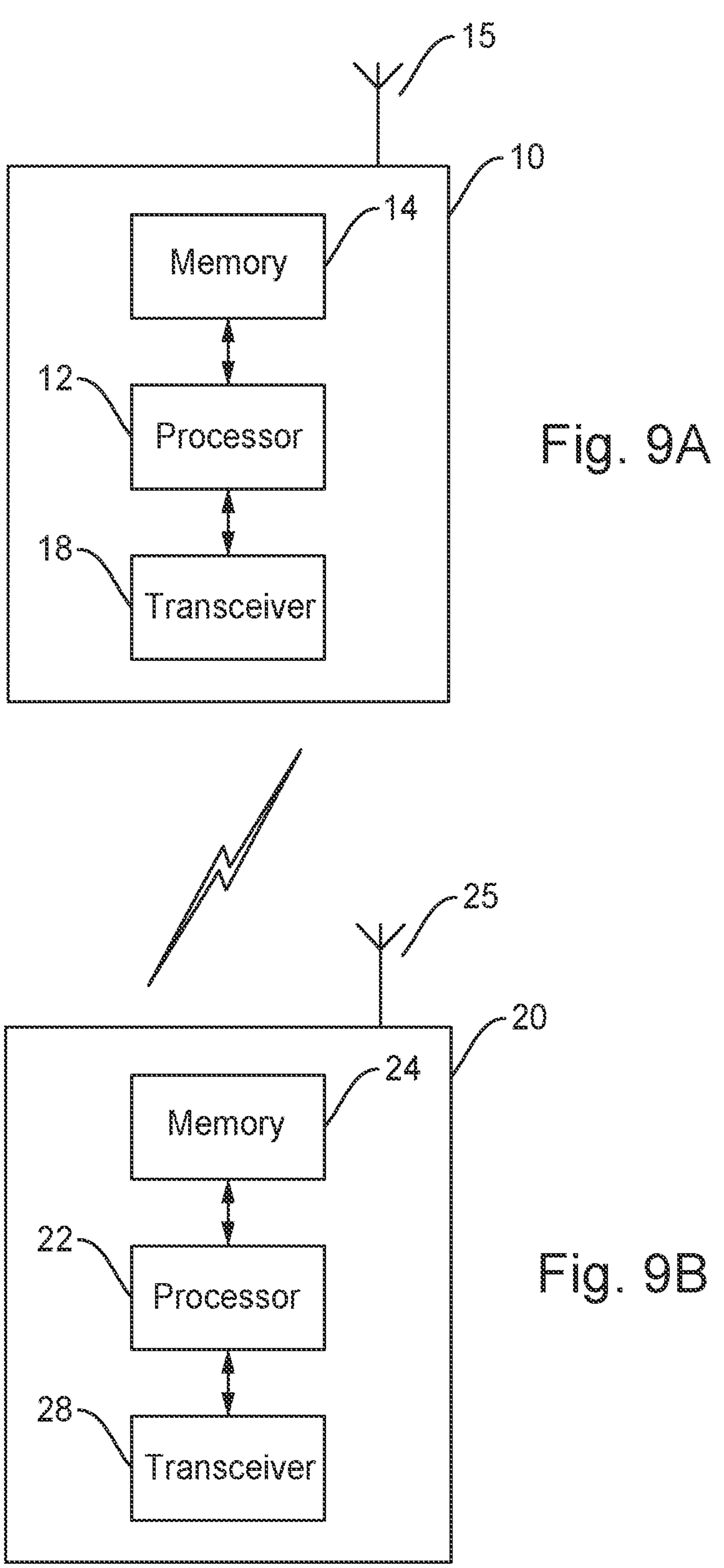
FIG. 9A illustrates an example block diagram of an apparatus, according to an embodiment.
FIG. 9B illustrates an example block diagram of an apparatus, according to an embodiment.

FIG. 9A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 9A.

As illustrated in the example of FIG. 9A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 9A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, WLAN access point, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 6-8, or any other method described herein. In some embodiments, as discussed herein, apparatus 10 may be configured to perform a procedure relating to handling of unconfigured measurement gaps for FBE operation, for example.

According to an example embodiment, apparatus 10 may be controlled by memory 14 and processor 12 to transmit or provide, to a UE, assistance information that may include at least one of a FFP configuration of a serving cell, a reference signal timing configuration for at least one neighbor cell, and/or SFN and frame timing difference reporting information for the at least one neighbor cell. In one embodiment, apparatus 10 may be controlled by memory 14 and processor 12 to transmit information on whether the serving cell supports measurement of the at least one neighbor cell outside at least one configured measurement gap occasion and/or supports cancellation or deactivation of at least one of the at least one configured measurement gap occasion. According to an embodiment, the measurement of the at least one neighbor cell may include measurement of at least one reference signal of the at least one neighbor cell, and/or measurement of SFN and frame timing difference of the at least one neighbor cell.

According to certain embodiments, apparatus 10 may be controlled by memory 14 and processor 12 to receive, from the UE, an indication indicating a capability to support the measurement of the at least one neighbor cell outside the at least one configured measurement gap occasion. In an embodiment, when the UE is capable of supporting the measurement of the at least one neighbor cell outside the at least one configured measurement gap occasion, apparatus 10 may be controlled by memory 14 and processor 12 to determine whether there is transmission to the UE during a period of time and, in accordance with a determination that there is no transmission during the period of time, based at least on the assistance information, to determine whether to transmit scheduling information for data transmission to the UE during the at least one configured measurement gap occasion subsequent to the period of time.

In some embodiments, to determine whether there is a transmission to the UE during the period of time, apparatus 10 may be controlled by memory 14 and processor 12 to determine whether there is transmission at a start of a FFP, where the period of time comprises the FFP. According to one embodiment, the period of time may be outside the at least one configured measurement gap occasion.

According to an embodiment, when the UE is capable of supporting the measurement of the at least one neighbor cell outside the at least one configured measurement gap occasion, apparatus 10 may be controlled by memory 14 and processor 12 to provide, to the UE, criteria on when to transmit scheduling information for data transmission to the UE outside the at least one configured measurement gap occasion and, when the criteria is fulfilled, to transmit the scheduling information for the data transmission to the UE during the at least one configured measurement gap occasion.

In an embodiment, the criteria may include at least a number of the measurement of the at least one neighbor cell outside the at least one configured measurement gap occasion. In certain embodiments, the criteria may be determined based at least on one or more of the following: signal strength of the serving cell, signal strength of the at least one neighbor cell, reference signal received quality of the serving cell, and/or configured 5G quality of service (5QI) UE sessions. According to some embodiments, different values may be provided for the criteria based on at least one of an urgency of the measurements and/or active 5QI UE sessions.

FIG. 9B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 9B.

As illustrated in the example of FIG. 9B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 6-8, or any other method described herein. For example, in an embodiment, apparatus 20 may be controlled to perform a process relating to unconfigured measurement gap handling, as described in detail elsewhere herein.

In an example embodiment, apparatus 20 may be controlled by memory 24 and processor 22 to receive, from a serving network node or cell, assistance information that may include at least one of a FFP configuration of the serving cell, a reference signal timing configuration for at least one neighbor cell, and/or SFN and frame timing difference reporting information for the at least one neighbor cell. In an embodiment, apparatus 20 may be controlled by memory 24 and processor 22 to determine whether there is transmission from the serving node or cell during a period of time and, in accordance with a determination that there is no transmission from the serving node or cell during the period of time, based at least on the assistance information, to perform measurement(s) of the at least one neighbor cell during the period of time.

According to an embodiment, the measurement of the at least one neighbor cell may include measurement of at least one reference signal of the at least one neighbor cell, and/or measurement of SFN and frame timing difference of the at least one neighbor cell. In one embodiment, the determination of whether there is a transmission from the serving node or cell during the period of time may include determining whether there is a transmission at a start of a FFP, where the period of time comprises the FFP. According to an embodiment, the period of time may be outside of at least one configured measurement gap occasion.

In certain embodiments, apparatus 20 may be controlled by memory 24 and processor 22 to receive information on whether the serving cell supports the measurement of the at least one neighbor cell outside the at least one configured measurement gap occasion and/or supports cancellation or deactivation of at least one of the at least one configured measurement gap occasion. According to some embodiments, when one or more measurements of the at least one neighbor cell are performed outside the at least one configured measurement gap occasion, apparatus 20 may be controlled by memory 24 and processor 22 to cancel or deactivate the at least one of the at least one configured measurement gap occasion subsequent to the one or more measurements. In certain embodiments, apparatus 20 may be controlled by memory 24 and processor 22 to receive criteria on when the user equipment monitors scheduling information for data transmission from the serving cell during the at least one configured measurement gap occasion. In an embodiment, the criteria may include at least a number of the measurement of the at least one neighbor cell outside the at least one configured measurement gap occasion. According to some embodiments, the criteria may be determined by the serving node or cell based at least on one or more of the following: signal strength of the serving cell, signal strength of the at least one neighbor cell, reference signal received quality of the serving cell, and/or configured 5QI UE sessions.

According to an embodiment, when one or more measurements of the at least one neighbor cell are performed outside of the at least one configured measurement gap occasion, and when the serving cell supports the measurement of the at least one neighbor cell outside the at least one configured measurement gap occasion and/or supports the cancellation or deactivation of the at least one of the at least one configured measurement gap occasion and when the criteria is fulfilled, apparatus 20 may be controlled by memory 24 and processor 22 to monitor for the scheduling information for the data transmission from the serving cell during the at least one of the at least one configured measurement gap occasion subsequent to the one or more measurements.

In an embodiment, when one or more measurements of the at least one neighbor cell are performed outside the at least one configured measurement gap occasion, apparatus 20 may be controlled by memory 24 and processor 22 to change a priority between intra-frequency and inter-frequency measurements during at least one of the at least one configured measurement gap occasion subsequent to the one or more measurements. According to an embodiment, when the serving cell does not support the measurement of the at least one neighbor cell outside the at least one configured measurement gap occasion and/or does not support the cancellation or deactivation of the at least one of the at least one configured measurement gap occasion, apparatus 20 may be controlled by memory 24 and processor 22 to modify its gap sharing priority between intra-frequency and inter-frequency measurements based on the measurement of the at least one neighbor cell.

According to some embodiments, apparatus 20 may be controlled by memory 24 and processor 22 to transmit, to the serving cell, an indication indicating capability to support the measurement of the at least one neighbor cell outside the at least one configured measurement gap occasion. In an embodiment, apparatus 20 may be controlled by memory 24 and processor 22 to perform at least one of inter-frequency measurements of the neighbour cells and/or intra-frequency measurements of the neighbour cells.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and/or management. As discussed in detail above, certain embodiments provide methods for enhanced or unconfigured measurement gap handling. For instance, certain embodiments are advantageous because they can reduce the need for measurement gaps for a UE without the autonomous measurement gap capability during FBE operation. Additionally, some embodiments may permit the UE to perform more measurements, i.e., gains are available even if a gNB does not support it. Furthermore, certain embodiments can improve URLLC performance in FBE operation.

Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:

at least one processor; and at least one memory comprising computer program code, the at least one memory and computer program code configured, with the at least one processor, to cause the apparatus at least to perform:

receiving, from a serving cell, assistance information, wherein the assistance information comprises a fixed frame period (FFP) configuration of the serving cell;

determining whether there is a transmission from the serving cell during a period of time; and in accordance with a determination that there is no transmission from the serving cell during the period of time, based at least on the assistance information, performing measurement of at least one neighbor cell during the period of time.

2. The apparatus of claim 1, wherein the measurement of the at least one neighbor cell comprises at least one of the following:

measurement of at least one reference signal of the at least one neighbor cell; and measurement of system frame number (SFN) and frame timing difference of the at least one neighbor cell.

3. The apparatus of claim 1, the determination of whether there is transmission from the serving cell during the period of time comprising:

determining whether there is transmission at a start of a FFP, wherein the period of time comprises the FFP.

4. The apparatus of claim 1, wherein the period of time is outside at least one configured measurement gap occasion.

5. The apparatus of claim 1, wherein the at least one memory and computer program code are configured, with the at least one processor, to cause the apparatus at least to perform:

receiving information on whether the serving cell supports the measurement of the at least one neighbor cell outside the at least one configured measurement gap occasion and/or supports cancellation or deactivation of at least one of the at least one configured measurement gap occasion.

6. The apparatus of claim 1, wherein, when one or more measurements of the at least one neighbor cell are performed outside the at least one configured measurement gap occasion, the at least one memory and computer program code are configured, with the at least one processor, to cause the apparatus at least to perform:

canceling or deactivating the at least one of the at least one configured measurement gap occasion subsequent to the one or more measurements.

7. The apparatus of claim 1, wherein the at least one memory and computer program code are configured, with the at least one processor, to cause the apparatus at least to perform:

receiving criteria on when the apparatus monitors scheduling information for data transmission from the serving cell during the at least one configured measurement gap occasion.

8. The apparatus of claim 7, wherein the criteria comprises at least a number of the measurement of the at least one neighbor cell outside the at least one configured measurement gap occasion.

9. The apparatus of claim 7, wherein the criteria is determined by the serving cell based at least on at least one of the following:

signal strength of the serving cell;

signal strength of the at least one neighbor cell;

reference signal received quality of the serving cell; and configured 5G quality of service identifier (5QI) user equipment sessions.

10. The apparatus of claim 7, wherein, when the one or more measurements of the at least one neighbor cell are performed outside the at least one configured measurement gap occasion, and when the serving cell supports the measurement of the at least one neighbor cell outside the at least one configured measurement gap occasion and/or supports the cancellation or deactivation of the at least one of the at least one configured measurement gap occasion and when the criteria is fulfilled, the at least one memory and computer program code are configured, with the at least one processor, to cause the apparatus at least to perform:

monitoring for the scheduling information for the data transmission from the serving cell during the at least one of the at least one configured measurement gap occasion subsequent to the one or more measurements.

11. The apparatus of claim 1, wherein, when one or more measurements of the at least one neighbor cell are performed outside the at least one configured measurement gap occasion, the at least one memory and computer program code are configured, with the at least one processor, to cause the apparatus at least to perform:

changing a priority between intra-frequency and inter-frequency measurements during at least one of the at least one configured measurement gap occasion subsequent to the one or more measurements.

12. The apparatus of claim 1, wherein, when the serving cell does not support the measurement of the at least one neighbor cell outside the at least one configured measurement gap occasion and/or does not support the cancellation or deactivation of the at least one of the at least one configured measurement gap occasion, the at least one memory and computer program code are configured, with the at least one processor, to cause the apparatus at least to perform:

modifying the apparatus' gap sharing priority between intra-frequency and inter-frequency measurements based on the measurement of the at least one neighbor cell.

13. The apparatus of claim 1, wherein the at least one memory and computer program code are configured, with the at least one processor, to cause the apparatus at least to perform:

transmitting, to the serving cell, an indication indicating capability to support the measurement of the at least one neighbor cell outside the at least one configured measurement gap occasion.

14. The apparatus of claim 1, wherein the at least one memory and computer program code are configured, with the at least one processor, to cause the apparatus at least to perform at least one of:

performing inter-frequency measurements of the at least one neighbour cell; and performing intra-frequency measurements of the at least one neighbour cell.

15. An apparatus, comprising:

at least one processor; and at least one memory comprising computer program code, the at least one memory and computer program code configured, with the at least one processor, to cause the apparatus at least to perform:

transmitting, to a user equipment, assistance information, wherein the assistance information comprises a fixed frame period (FFP) configuration of a serving cell.

16. The apparatus of claim 15, wherein the at least one memory and computer program code are configured, with the at least one processor, to cause the apparatus at least to perform:

transmitting information on whether the serving cell supports measurement of at least one neighbor cell outside at least one configured measurement gap occasion and/or supports cancellation or deactivation of at least one of the at least one configured measurement gap occasion.

17. The apparatus of claim 16, wherein the measurement of the at least one neighbor cell comprises at least one of the following:

measurement of at least one reference signal of the at least one neighbor cell; and measurement of system frame number (SFN) and frame timing difference of the at least one neighbor cell.

18. The apparatus claim 16, wherein the at least one memory and computer program code are configured, with the at least one processor, to cause the apparatus at least to perform:

receiving from the user equipment indication indicating capability to support the measurement of the at least one neighbor cell outside the at least one configured measurement gap occasion.

19. The apparatus of claim 18, wherein when the user equipment is capable of supporting the measurement of the at least one neighbor cell outside the at least one configured measurement gap occasion, the at least one memory and computer program code are configured, with the at least one processor, to cause the apparatus at least to perform:

determining whether there is transmission to the user equipment during a period of time; and in accordance with a determination that there is no transmission during the period of time, based at least on the assistance information, determining whether to transmit scheduling information for data transmission to the user equipment during the at least one configured measurement gap occasion subsequent to the period of time.

20. The apparatus of claim 19, the determination of whether there is transmission to the user equipment during the period of time comprising:

determining whether there is transmission at a start of a FFP, wherein the period of time comprises the FFP.

* * * * *